United States Patent
Acharkan et al.

[11] 3,830,097
[45] Aug. 20, 1974

[54] METHOD FOR MEASURING DIAMETER AND FLEXIBILITY OF RUBBER SHAFT SEALS

[76] Inventors: Evgeny Adolfovich Acharkan, Novopeschanaya ul., 3, kv. 38; Ilia Naumovich Khaskin, ul. Akademika Koroleva, 5, kv. 167; Isaak Meerovich Tsirulnikov, ul.B. Galushkina, 12, kv. 70; Emil Lvovich Povolotsky, Matveevskaya ul., 10, korpus 4, kv. 63; Vladimir Solomonovich Jurovsky, ul. Udaltsova, 10, kv. 68, all of Moscow, U.S.S.R.

[22] Filed: Aug. 18, 1972

[21] Appl. No.: 281,773

[52] U.S. Cl.................................. 73/37.5, 73/46
[51] Int. Cl..................... G01b 13/08, G01b 13/12
[58] Field of Search................................ 73/37.5, 46

[56] References Cited
UNITED STATES PATENTS
3,030,800  4/1962  Dega.................................. 73/37.5
3,097,521  7/1963  Dega..................................... 73/40

Primary Examiner—Richard C. Queisser
Assistant Examiner—Daniel M. Yasich
Attorney, Agent, or Firm—Eric H. Waters

[57] ABSTRACT

A method relating to measuring and sorting out sealing components formed of resilient materials of rubber type. The test mandrel of a tapered shape is located in a chamber joined with a low-pressure pneumatic measuring system. While moving the mandrel in the seal being tested through the chamber window and supplying successively low and high-pressure air into the chamber, measurements are taken, first of the seal diameter, and then of the seal flexibility.

1 Claim, 2 Drawing Figures

PATENTED AUG 20 1974　　　　　　　3,830,097

3,830,097

METHOD FOR MEASURING DIAMETER AND FLEXIBILITY OF RUBBER SHAFT SEALS

The invention relates to quality control and measuring apparatus, and more particularly, to means of measuring and sorting out lip-type seals fabricated from resilient materials such as rubber or elastomeric materials.

The present invention can most effectively be utilized for measuring the seal diameter and the flexibility (pressure effort) of the sealing element of the rubber reinforced cups which find wide application in many branches of modern machine building industry for sealing the rotating parts of installations.

Gauging systems for measuring the quality of lip-type seals by their diameter and flexibility have already been proposed (U.S. Pat. No. 3,097,521).

In familiar systems the stated parameters are measured for quality by pneumatic gauges and three cylindrical test mandrels entering in turn the seal being tested, of which two are used to measure the seal diameter and one — to assess the flexibility of the seal.

A serious disadvantage of the system is the considerable number of cylindrical test mandrels and the need for changing them which entails a loss of productivity.

In addition, such a system establishes only the fact that the seal diameter corresponds to the predetermined limit values of the pair of cylindrical test mandrels without determining the degree to which the seal diameter approaches the tolerance limit. The measurement results on the flexibility of the seals, varying noticeably in seal diameters, are considerably influenced by various deformations of the sealing elements caused while placing the seals on the third test mandrel whose performance diameter is selected to be equal to the diameter of the mated shaft.

It is an object of the present invention to increase precision and productive control of parts of elastomeric materials.

This and other objects are accomplished due to a method for measuring the seal diameter and the flexibility of rubber shaft seals consisting in that the test mandrel is so located that it can move axially in the chamber joined with the rubber seal being tested, the test mandrel engaging the seal diameter through the chamber window; then low and high-pressure air is successively conveyed to the chamber and the air consumption is registered through a clearance between the test mandrel and the seal; according to the invention the test mandrel has a tapered shape with the top or largest diameter of the taper directed to the window in the chamber which leads to determining the seal diameter as the test mandrel is moved in the seal when air of relatively low pressure is being conveyed to the chamber along the axial displacement of the mandrel with respect to its adjustment position when the clearance between the mandrel and the seal disappears; the flexibility of the seal is being determined by the established pressure in the chamber when the test mandrel is moved by a constant value corresponding to a predetermined tightness of the seal and when air of relatively high pressure is supplied to the chamber.

The proposed method makes it possible to measure the basic parameters of rubber seals providing higher accuracy and productivity. In doing so, the productivity of the measuring process is being increased by combining two operations on one position, and the accuracy of measuring the flexibility is being increased by excluding the error introduced by the variations in seal diameter being measured which allows for assessing the flexibility of the sealing elements, only as a function of the resilient and plastic properties of the material.

Other objects and advantages of the present invention will become more apparent by reference to the following description of embodiments thereof and accompanying drawings, wherein.

Figures 1, 2:
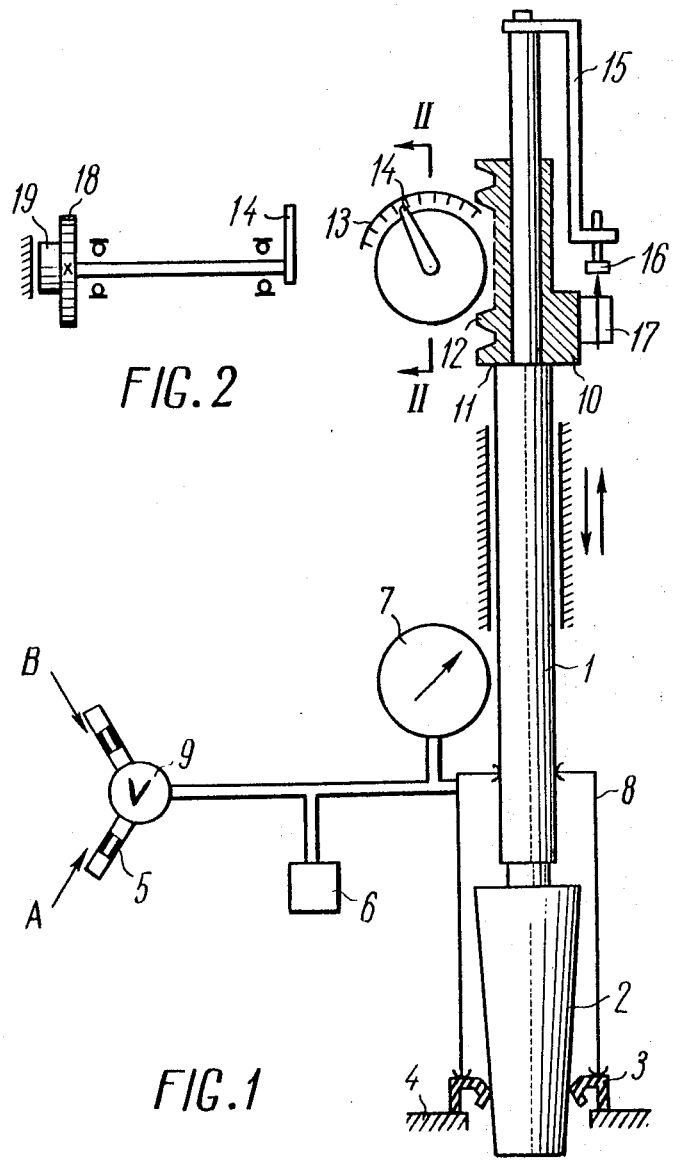
FIG. 1 is the basic diagram of the device for realising the proposed method according to the invention.
FIG. 2 is an axial elevational view of the reading mechanism scale for measuring the diameter seal.

The device disclosed in FIG. 1 comprises a spindle 1, a mechanism for moving the spindle 1 (not shown in FIG. 1), but schematically shown by two oppositely directed arrows. A test mandrel 2 which in the course of measurement engages the seal 3 mounted on the basis plane of the table 4, a low-pressure selectively operable pneumatic measuring system for registering the air consumption through the clearance between the mandrel 2 and the seal 3 in measuring the seal diameter, the pneumatic measuring system containing a source of low-pressure air (e.g., 0.02 to 0.05 atm) (the direction of supply is indicated by arrow A), an inlet nozzle 5 to which the low-pressure is fed and a pneumatic-electrical gauge 6. Besides, the device comprises a high-pressure (e.g., 2 to 4 atm.) selectively operable measuring system for determining the air consumption through the clearance between the mandrel and the seal while assessing the flexibility of the sealing element, the pneumatic system containing a source of high-pressure air (the direction of supply is indicated by arrow B) and a pressure gauge 7; the chamber 8 which is in turn connected to the sources of compressed air by means of the selectively operable turnover valve means 9 and is equipped with sealing elements mated with the spindle 1 and the seal 3 being tested. One of the walls of the chamber 8 contains a window through which the test mandrel passes to engage the seal 3 being measured.

The test mandrel 2 has a tapered shape with the taper top or largest diameter directed to the window in the chamber 8 and is secured to the spindle 1.

The mechanism designed to stop the spindle 1 and to determine its position while taking in the clearance between the test mandrel 2 and the seal 3 comprises a slide 10 which is moved in one direction together with the spindle 1 by the friction forces, and in the other direction — by the rim 11 on the spindle 1, the toothed wheel 18 (FIG. 2) which engages the rack 12 threaded on the slide 10, and the angle scale 13 for reading the angle of rotation of the pointer 14 rigidly connected to the braking clutch 19 (FIG. 2) and via the toothed wheel 18, the slide 10 and the spindle 1, to the test mandrel 2.

The mechanism of additional movement of the slide 10 by a constant value after taking in the clearance between the mandrel 2 and the seal 3 for determining the flexibility of the seal 3 comprises a frame 15 secured to the end of the spindle 1, a stop 16, an end switch 17 fixed to the slide 10. Prior to work the angle scale 13 is being set to zero position by making use of model components, and the stop 16 is being set with respect to the end switch 17 for a constant travel (the value of the test mandrel conicity taken into account) corresponding to the predetermined tightness of the seal.

The device operates in the following way.

The seal 3 tested for quality is being placed on the table 4 with the sealing element looking upward. Low-pressure air is supplied to the chamber 8 after its end has been joined with the end of the seal 3 being tested, and while the spindle 1 is moving, the test mandrel 2 enters the seal 3 through the window of the chamber. In doing so, the pressure in the chamber 8 as the clearance between the mandrel 2 and the seal 3 is being taken in, increases up to the level at which air stops leaking from the chamber 8 and the gauge 6 actuates. The gauge sends a command to the switch in the braking clutch 19 which stops the slide 10.

The axial displacement of the test mandrel 2 with respect to its adjustment position and, consequently, the value of the diameter of the seal 3 are determined by the position of the pointer 14 with respect to the scale 13.

To measure the flexibility of the seal 3 the spindle 1 is moved a little to tighten the sealing element. The spindle 1 is moved by a constant value starting from the moment when the clearance between the mandrel 2 and the seal 3 has been taken in so that the tightness does not depend on the value of the diameter of the seal 3. In doing so, the slide 10 remains where it is, and the spindle moves until the stop 16 engages the end switch 17. High-pressure air is conveyed into the chamber 8 by means of the turn-over switch 9. The compressed air depending on the flexibility of the seal 3 creates a clearance between the seal and the mandrel 2 through which air escapes to the atmosphere. A pressure proportional to the flexibility of the sealing element is being set up in the chamber 8. This pressure is measured by the pressure gauge 7 whose scale is calibrated in flexibility units.

In addition, the flexibility of the seal can be checked up in the traditional manner when the mandrel enters the seal until the diameter of the seal equals that of the shaft mated with it, this being followed by high-pressure air supplied into the chamber. In this case the moment when the mandrel stops is being determined by a command from another end switch (not shown in FIG. 1).

What is claimed is:

1. A method for measuring the diameter and the flexibility of rubber shaft seals by a cylindrical chamber having an end hermetically joined with the rubber seal being tested and having a window in which a test mandrel is inserted, comprising the steps of: moving a tapered test mandrel axially through said window and into the rubber seal being tested with the tapered top or largest diameter portion of said mandrel directed to said chamber window; supplying relatively low-pressure air into said chamber; measuring selectively the diameter of said seal by the axial displacement of said mandrel with respect to its adjusted position when the clearance between said mandrel and said seal is substantially zero; moving said test mandrel by a constant value with respect to its position at the instant that said clearance is substantially zero; selectively supplying relatively high-pressure air into said chamber and measuring the pressure therein while the mandrel is moved at said constant valve for determining the flexibility of said seal on the basis that said flexibility is proportional to the pressure established in said chamber.

* * * * *